Figure 1:
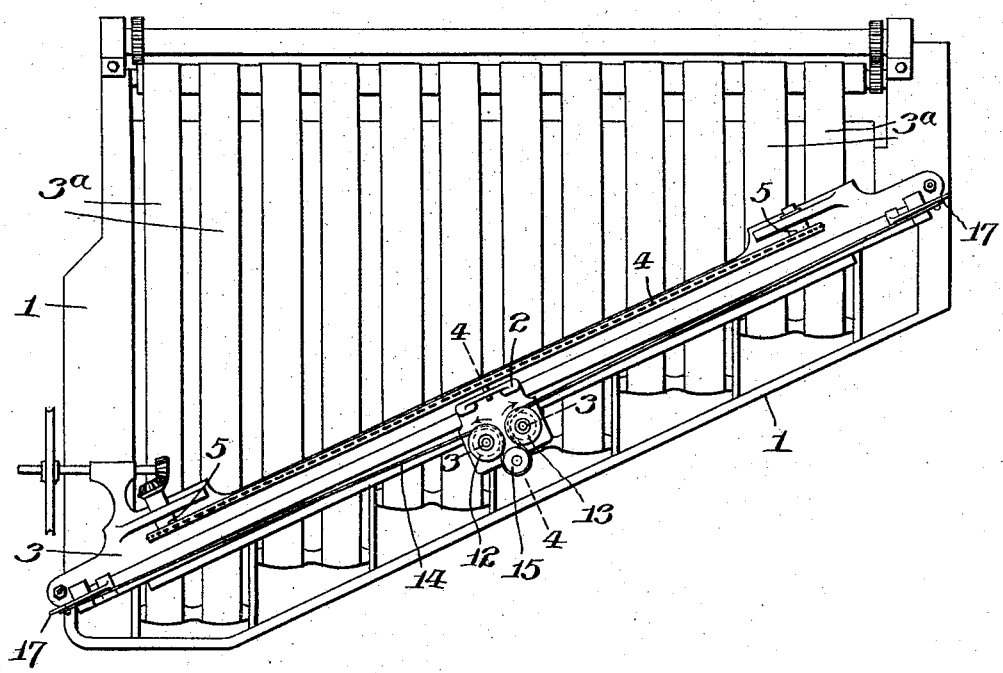
Figure 2:
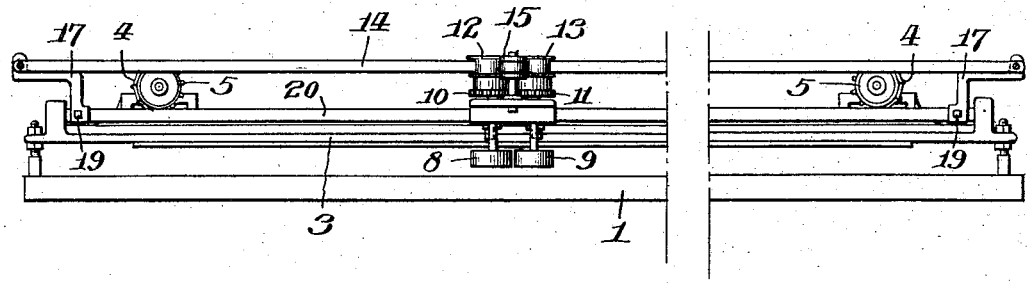

No. 765,490. PATENTED JULY 19, 1904.
T. KERSHAW.
FEEDING MECHANISM FOR CARDING MACHINES.
APPLICATION FILED SEPT. 5, 1902.
NO MODEL. 2 SHEETS—SHEET 1.

WITNESSES:
H. L. Cheeseman
G. Sickles

INVENTOR
Thomas Kershaw
BY
A. V. Groupe
ATTORNEY.

No. 765,490. PATENTED JULY 19, 1904.
T. KERSHAW.
FEEDING MECHANISM FOR CARDING MACHINES.
APPLICATION FILED SEPT. 5, 1902.
NO MODEL. 2 SHEETS—SHEET 2.
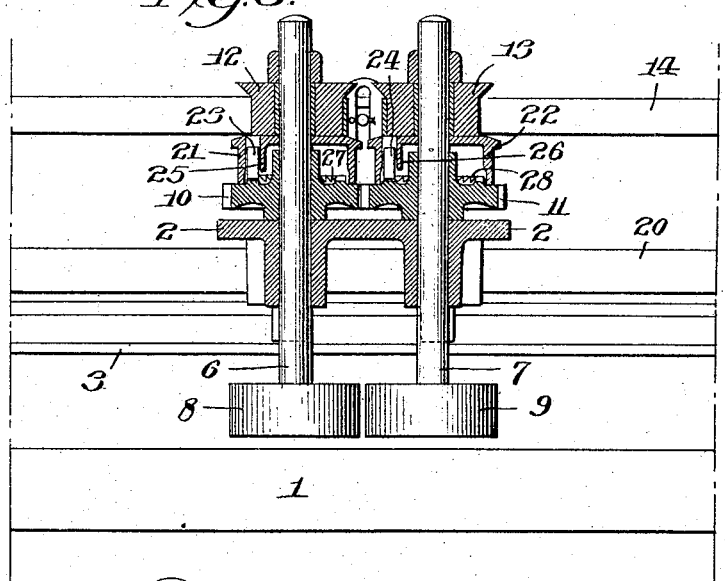
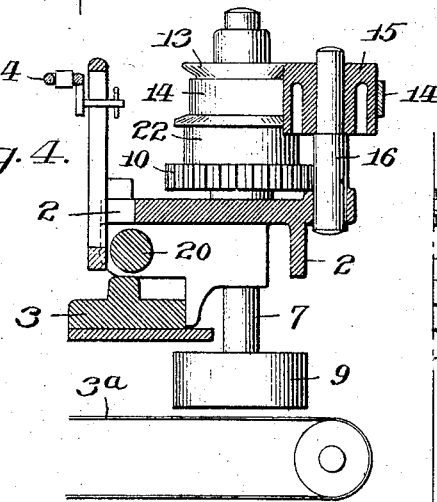
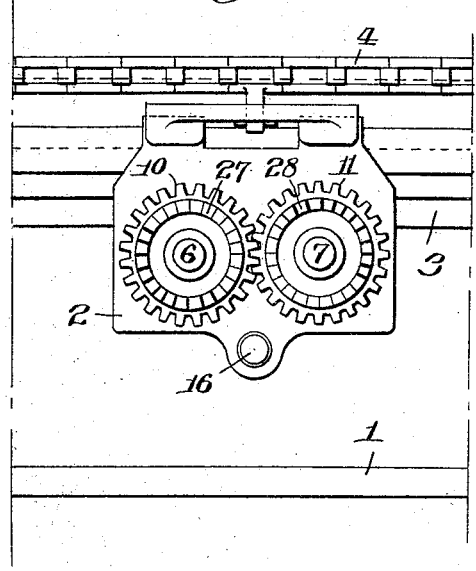
WITNESSES:
H. L. Cheeseman
Gustavous Sickles
INVENTOR
Thomas Kershaw
BY A. V. Groupe
ATTORNEY.